Figure 6:
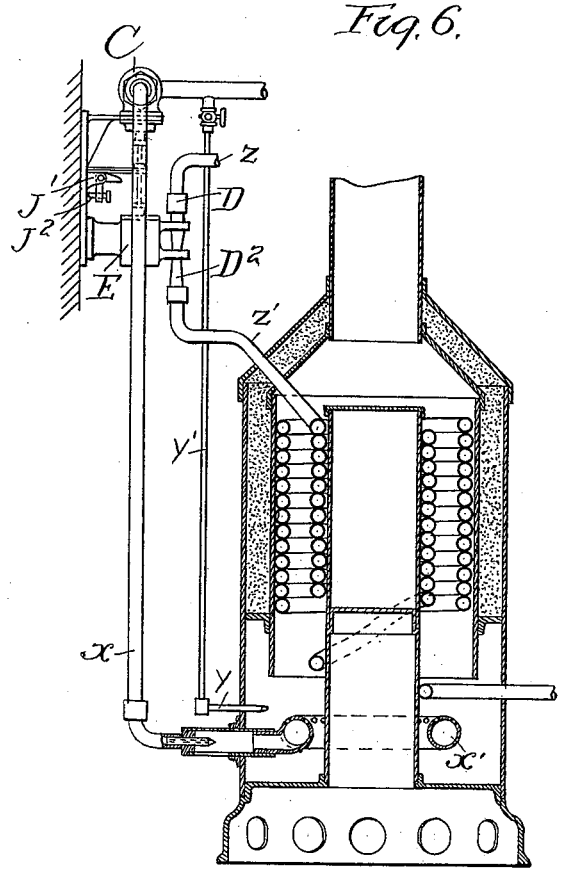

No. 652,951. Patented July 3, 1900.
M. A. ADAM.
CONTROLLER FOR WATER HEATERS.
(Application filed Oct. 4, 1899.)
(No Model.) 2 Sheets—Sheet 1.
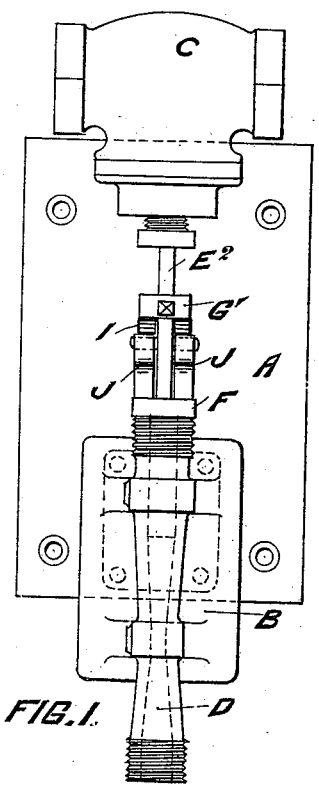
FIG. 1.
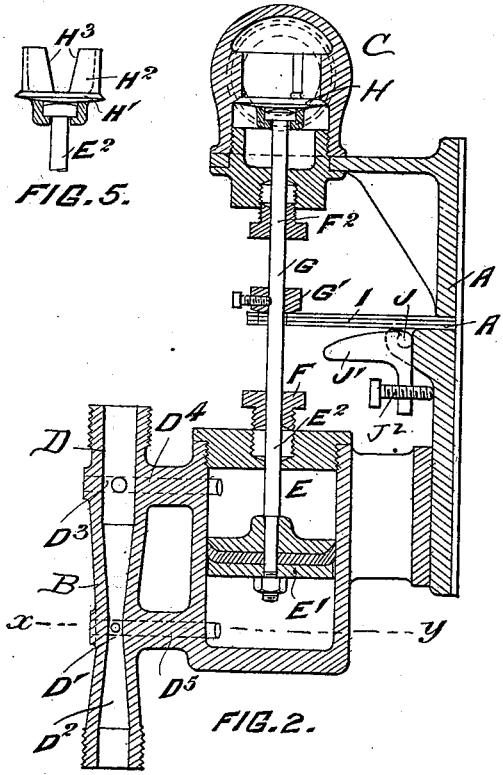
FIG. 5.
FIG. 2.
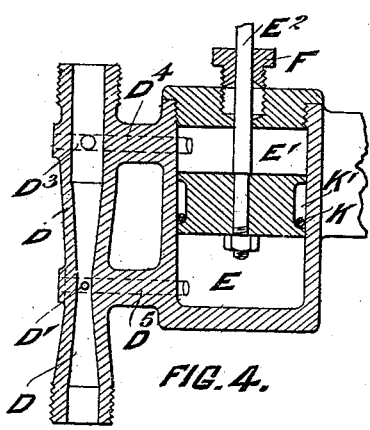
FIG. 4.
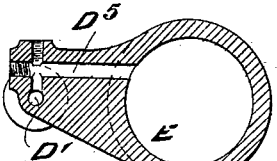
FIG. 3.
WITNESSES:
INVENTOR
Matthew Atkinson Adam
BY
ATTORNEYS No. 652,951.

M. A. ADAM.

CONTROLLER FOR WATER HEATERS.

(Application filed Oct. 4, 1899.)

Patented July 3, 1900.

(No Model.)

2 Sheets—Sheet 2.

WITNESSES:
Ella L. Giles
[signature]

INVENTOR
Matthew Atkinson Adam
BY
[signature]
ATTORNEYS

UNITED STATES PATENT OFFICE.

MATTHEW ATKINSON ADAM, OF LONDON, ENGLAND.

CONTROLLER FOR WATER-HEATERS.

SPECIFICATION forming part of Letters Patent No. 652,951, dated July 3, 1900.

Application filed October 4, 1899. Serial No. 732,543. (No model.)

*To all whom it may concern:*

Be it known that I, MATTHEW ATKINSON ADAM, electrical engineer, a subject of the Queen of Great Britain and Ireland, residing at 1 Rockwell Terrace, Cricklewood, London, England, have invented certain new and useful Improvements in Controllers for Water-Heaters, (for which I have filed an application for patent in Great Britain, No. 5,238, dated March 9, 1899,) of which the following is a specification.

My invention relates to improvements in controllers for regulating the supply of heat to water-heaters, and has for its object to regulate the supply of heat to the heater in proportion to the quantity of water being drawn off from the heater.

My invention consists in providing a contracted area in the supply-pipe and in using the difference between the pressure in the normal area of the pipe and the pressure in the contracted area when water is flowing to operate a piston or diaphragm connected with and regulating the gas-valve controlling the supply of gas to the water-heater.

It also consists in detail apparatus for carrying out this regulation.

In carrying my invention into effect generally I make my device in the form of a piece of pipe suitable for connecting in the pipe from the water-main to the water-heater. This piece of pipe is made with a sectional area first gradually contracted to a minimum area and then gradually expanded to its original area. The contraction, and more especially the expansion again, should be so gradual as not to cause eddying flow in the water passing through the pipe. I then connect one end of a cylinder with a part of the pipe above the contraction. The other end of the cylinder I connect with the pipe at its point of smallest sectional area. A suitable piston is provided to work in this cylinder. I prefer to pack the piston with a rubber ring of circular section freely rolling on the piston between suitable flanges thereon in a well-known manner. The piston-rod passes out through a suitable stuffing-gland in one end of the cylinder, and its end is suitably attached to the stem of a gas-valve controlling the flow of gas to a burner supplying heat to a water-heater or boiler of any suitable type. I also provide a spring or other suitable device to hold the gas-valve shut and to offer suitable resistance to its opening, so that the quantity of gas allowed to pass to the burner is just that which will give the heat required by the heater for the final temperature of water chosen. When there is no flow of water through the contracted pipe, the pressure in the contracted area is the same as that in any other part of the pipe. When a flow of water is caused through this contracted pipe—say, by opening a tap on the water-main leading from the boiler—the velocity of flow through the contracted area of the pipe is much higher than the velocity of flow through the normal area of the pipe, and as the energy of the water is the same at both points the pressure in the contracted area is much less than the pressure at any point where the pipe is of normal area. Now as the contracted area is connected with one end of the piston and the normal area with the other end of the piston the difference of pressure will cause the piston to move, and thereby to open the gas-valve against the forces holding it shut. By suitably proportioning these resisting forces and the area of opening of the valve for a given lift the quantity of gas passed can be made exactly that required to heat the quantity of water passing at that moment to the temperature required. The water can by this apparatus therefore be heated automatically, so as to be delivered at always the same temperature whether a large or a small quantity be drawn off. It will thus be seen that by suitably regulating the parts of this apparatus the heat supplied to the coil-boiler can be made proportional to the quantity of water drawn off from the boiler, so that if the hot-water apparatus be used to supply baths the final temperature of the water will vary little through a considerable range of supply of hot water. If the apparatus be made to supply, say, ten baths, it will adjust itself by the simple turning of the bath-taps and will equally well supply, say, three baths.

A pilot-light is used to light up the burner supplying heat to the coil-boiler. The apparatus is thus perfectly automatic and supplies hot water by simply turning on the bathcocks.

A coil water-heater or boiler of any suitable type, such as the Herreshoff boiler, may be used to heat the water.

Referring to the accompanying sheet of drawings, Figure 1 shows a front elevation, and Fig. 2 a side sectional elevation, of my improved regulating apparatus. Fig. 3 is a sectional plan on the line X Y, Fig. 2. Fig. 4 shows a modified form of piston-packing applied to the apparatus shown in Figs. 1 and 2. Fig. 5 shows in elevation a modified gas-valve for use in one form of my apparatus. Fig. 6 is a view of the controller combined with a water-heater.

On the sole A, Figs. 1 and 2, are fixed the regulating apparatus B and the gas-valve C. The regulating apparatus B consists of a pipe D, having a contracted area at D' and a gradually-expanding part $D^2$. The pipe D is attached in the water connection to the heater in any suitable manner. The pipe D is connected at $D^3$ and D' by pipes or passages $D^4$ and $D^5$, respectively, to a cylinder E, in which works the piston E'. The piston-rod $E^2$ passes through the stuffing-gland F and has a collar G' fixed on it at G. The rod $E^2$ then has the gas-valve H attached to its end. A blade-spring I is fixed to the sole A at A', and a curved lever-arm J' is provided, hooked to the sole by the double bracket J and having a regulating-screw $J^2$. It will be readily seen that when no water is flowing in the pipe D the spring I will be holding the valve H shut by means of the collar G'. When flow of water takes place, the piston E' moves against the spring I to a place of equilibrium for that amount of flow and opens the valve H, permitting the requisite flow of gas to heat the water flowing when the apparatus has been properly adjusted by means of the screw $J^2$ and the curved arm J'. Instead of the curved arm J' a valve H', as shown in Fig. 5, may be used, and a spiral spring may be substituted for the spring I to hold the gas-valve shut. The valve H' has a cylindrical guide-ring $H^2$ instead of the usual guide-ribs, and this ring is provided with tapered passage-ways $H^3$, which are so shaped as to give the required passage of gas to heat the water for any particular lift of the valve. In this case the taper of the passage-ways enables the proper quantity of gas to be passed without regulating the force applied by the spring. The piston shown in Fig. 4 is provided with the well-known form of packing-ring, in which the ring K rolls in a piston-groove K' to reduce the friction of the moving parts.

Fig. 6 shows the water and controller combined. In this drawing, $x$ is the gas-pipe, controlled by the valve C and supplying the burner $x'$ of the water-heater. A pilot-light $y$ is supplied by the pipe $y'$. The connection from the water-main to the controller is shown at $z$, and a pipe $z'$ connects the controller with the coil of the water-heater.

The detail construction of the water-heater is not a part of this invention, and no detail description thereof is necessary.

Having now described my invention, what I claim as new, and desire to secure by Letters Patent, is—

1. In apparatus for controlling the supply of heat to a gas-heated water-heater, the combination of a water-supply pipe whose bore has a contracted area gradually expanding to the normal area, with a cylinder having connecting-passages from the normal and contracted areas of said pipe to opposite sides of a piston, adapted to automatically operate a gas-valve controlling the supply of gas to the heater-burner, substantially as set forth.

2. The combination of a gas-heated water-heater, with an automatic gas-regulator consisting of a contracted pipe having its normal and contracted areas respectively connected to the opposite sides of a piston or diaphragm attached to a valve which controls the flow of gas to the heating-burner, substantially as set forth.

3. In a gas-heated water-heater the combination of a contracted pipe such as D with passages such as $D^4$ and $D^5$ communicating with a cylinder such as E and a piston such as E' with a rod $E^2$ carrying a gas-valve on its end and means for applying a tension to the said rod, substantially as and for the purpose set forth.

In witness whereof I have hereunto set my hand in presence of two witnesses.

MATTHEW ATKINSON ADAM.

Witnesses:
ALBERT G. PARKER,
F. J. BIGNELL.